(12) United States Patent
Mallard et al.

(10) Patent No.: US 6,676,099 B2
(45) Date of Patent: Jan. 13, 2004

(54) RUNNER FOR A VEHICLE SEAT

(75) Inventors: Patrick Mallard, Montsecret (FR); Michel Timon, Caen (FR)

(73) Assignee: Faurecia Sieges d'Automobile S.A., Boulougne (FR)

( * ) Notice: Subject to any disclaimer, the term of this patent is extended or adjusted under 35 U.S.C. 154(b) by 147 days.

(21) Appl. No.: 09/902,196

(22) Filed: Jul. 10, 2001

(65) Prior Publication Data

US 2002/0008183 A1 Jan. 24, 2002

(30) Foreign Application Priority Data

Jul. 19, 2000 (FR) .............................. 00 09463

(51) Int. Cl.⁷ .............................................. F16M 13/00
(52) U.S. Cl. ...................................... 248/429; 248/430
(58) Field of Search ................... 384/46, 47; 248/429, 248/430, 434

(56) References Cited

U.S. PATENT DOCUMENTS

| | | | |
|---|---|---|---|
| 5,137,244 A | * 8/1992 | Negi | 248/430 |
| 5,921,606 A | * 7/1999 | Moradell et al. | 296/65.03 |
| 5,961,089 A | * 10/1999 | Soisnard | 248/430 |
| 5,984,254 A | * 11/1999 | Baloche et al. | 248/430 |
| 6,427,962 B1 | * 8/2002 | Rohee et al. | 248/424 |

FOREIGN PATENT DOCUMENTS

| | | | |
|---|---|---|---|
| DE | 195 48 871 | 3/1997 | |
| DE | 19548871 | * 3/1997 | ............ B60N/2/50 |
| EP | 0 421 300 | 4/1991 | |
| EP | 0 842 807 | 5/1998 | |
| FR | 2 793 453 | 11/2000 | |
| FR | 2793453 | * 11/2000 | ............ B60N/2/07 |
| WO | WO 97/03859 | 2/1997 | |

OTHER PUBLICATIONS

Search Report issued by the French Patent Office for parent French Application No. 00 09463 filed on Jul. 19, 2000; report dated May 15, 2001.

* cited by examiner

Primary Examiner—Leslie A. Braun
Assistant Examiner—Kofi Schulterbrandt
(74) Attorney, Agent, or Firm—Marshall, Gerstein & Borun LLP

(57) ABSTRACT

A vehicle seat runner comprising at least one stationary channel section bar whose rear end is engaged snugly in a reinforcing bar made by extruding a light alloy.

4 Claims, 1 Drawing Sheet

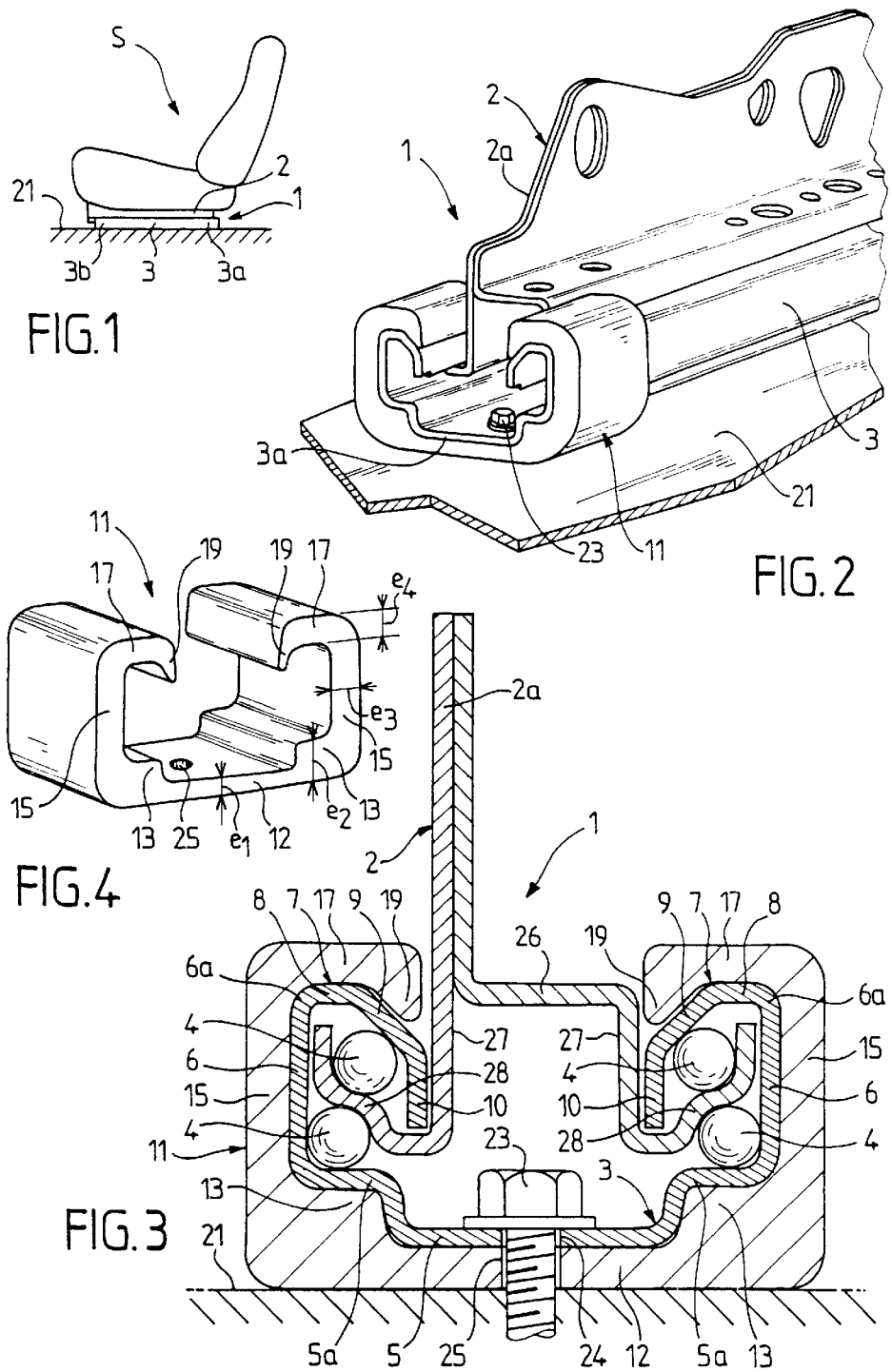

RUNNER FOR A VEHICLE SEAT

The present invention relates to vehicle seat runners.

More particularly, the invention relates to a vehicle seat runner, comprising a stationary channel section bar made of folded and cut steel sheet, said stationary bar presenting:

a web;

two side flanges extending parallel to each other, each from the web to a free end; and two lips extending towards each other from the respective free ends of the two side flanges, and defining between them a slot for receiving at least one support member adapted to be fixed to the vehicle seat;

the stationary bar extending over a certain length between a front end and a rear end for securing to the floor of the vehicle.

BACKGROUND OF THE INVENTION

Document EP-A-0 842 807 describes an example of such a runner.

Known runners of that type give full satisfaction: in particular, they are very strong and lightweight, and they are low in cost given their method of manufacture. Nevertheless, given the constant rise in mechanical performance required by standards, it can be desirable in some cases to further improve the mechanical strength of such runners, particularly in the event of the vehicle being subjected to a frontal impact.

OBJECTS AND SUMMARY OF THE INVENTION

A particular object of the present invention is to improve the mechanical strength of runners of the above-mentioned type, without excessively penalizing their weight or their cost price.

To this end, according to the invention, in a runner of the kind in question, the stationary bar is engaged in an extruded reinforcing bar made of a light alloy, the reinforcing bar being secured to the stationary bar by presenting, itself, a substantially channel section with a web placed against the web of the stationary bar, two side flanges hugging the flanges of the stationary bar, and two lips extending the flanges of said reinforcing bar and overlying the lips of the stationary bar, so as to bear against said lips of the stationary bar; and said reinforcing bar is placed at the rear end of the stationary bar and extends over a length that is shorter than one-third of the length of the stationary bar.

By means of these dispositions, the stationary bar is reinforced at its rear anchor point, which is subjected to greater tear-out forces in the event of a frontal impact accident. This provides considerably improved mechanical strength, specifically by preventing the stationary bar from opening under a violent tear-out force from the seat. In addition, the reinforcing bar is of low cost and is lightweight, and it does not interfere with normal operation of the runner.

In preferred embodiments of the invention, use can optionally be made of one or more of the following dispositions:

the reinforcing bar has an inside surface that is complementary to the stationary bar, said reinforcing bar being in contact with the stationary bar over its entire inside surface;

at least one hole is made through the web of the stationary bar towards the rear end of said stationary bar in order to receive a bolt for fixing to the floor of the vehicle, the web of the reinforcing bar also having a hole in register with the hole in the web of the stationary bar so as allow said bolt to pass;

the reinforcing bar is of a thickness greater than 5 millimeters (mm), at least over its flanges and lips;

the web of the stationary bar forms two side ledges extending towards the lips of said stationary bar and extended by the flanges of the stationary bar, while the reinforcing bar presents two thick zones placed in register with said ledges and coming into contact with the stationary bar beneath said ledges, respectively, said thick zones presenting a thickness greater than the thickness of the flanges of the reinforcing bar: these thick zones enable the strength of the reinforcing bar to be increased since said thick zones are situated in a portion of the reinforcing bar which is subjected to particularly high mechanical stresses in the event of an accident;

the thick zones of the web of the reinforcing bar have a thickness of material of not less than 10 mm;

the length of the reinforcing bar is shorter than 10 centimeters (cm);

the runner further comprises said support member in the form of a moving bar of steel slidably mounted in the stationary bar; and the moving bar is of upside-down channel section with a web parallel to the web of the stationary bar and with two side flanges extending the web of the moving bar towards the web of the stationary bar between the side flanges of the stationary bar, the side flanges of the moving bar being extended outwardly by lips in the form of troughs engaged beneath the lips of the stationary bar, which lips of the stationary bar are in the form of upside-down troughs.

BRIEF DESCRIPTION OF THE DRAWING

Other characteristics and advantages of the invention appear from the following description of an embodiment thereof, given by way of non-limiting example and with reference to the accompanying drawing.

In the drawing:

FIG. 1 is a diagrammatic view of a motor vehicle seat fitted with runners constituting an embodiment of the invention;

FIG. 2 is a fragmentary perspective view of one of the runners of the FIG. 1 seat;

FIG. 3 is a cross-section view of the runner of FIG. 2; and

FIG. 4 is a perspective view of the reinforcing bar of the runner of FIGS. 2 and 3.

MORE DETAILED DESCRIPTION

In the various figures, the same references are used to designate elements that are identical or similar.

FIG. 1 shows a motor vehicle seat S slidably mounted on the floor 21 of the vehicle by means of two parallel runners 1, only one of which is visible in FIG. 1. Each runner comprises a moving steel bar 2 which carries the seat S and which slides in a stationary bar 3 made of folded and cutout steel sheet and fixed to the floor 21 of the vehicle via its rear and front ends 3a and 3b.

As shown in FIGS. 2 and 3, the moving bar 2 is slidably mounted in the stationary bar 3, generally with balls 4 being interposed between the stationary and moving bars.

Locking means (not shown) and known per se, are also provided between the stationary and moving bars so as to enable a user to adjust the position of the seat in the longitudinal direction.

The stationary bar 3 is substantially of channel section, and comprises:

- a bottom web 5 which is horizontal in this case and which includes on its longitudinal edges two upwardly-offset side ledges 5a;
- two vertical side flanges 6 each extending upwards from the corresponding ledge 5a to a top end 6a; and
- two lips 7 which extend towards each other from the respective free ends 6a of the flanges of the stationary bar, defining between each other a slot that receives the above-mentioned moving bar 2.

In the example shown, each lip 7 is in the form of a reentrant trough, comprising a horizontal wall 8 extending the corresponding vertical flange 6, followed by a downwardly sloping wall 9, and then a vertical wall 10.

The rear end 3a of the stationary bar 3 is engaged snugly in a short segment of reinforcing bar 11, the reinforcing bar being made by extrusion and sawing a light alloy, in particular an alloy based on aluminum. The length of the reinforcing bar 11 is less than one-third the length of the stationary bar 3, with the length of the reinforcing bar being preferably less than 10 cm, and advantageously lying in the range 3 cm to 7 cm. The bar 11 can weigh less than 80 grams (g), for example, and can advantageously weigh about 60 g.

The reinforcing bar 11 is substantially of channel section, and its entire inside surface comes into contact with the outside surface of the stationary bar 3. Said bar 11 comprises:

- a bottom web 12 whose central portion is of thickness e1 of at least 5 mm and preferably not more than 10 mm; the web 5 of the stationary bar rests on this web 12, and the web 12 has two thick side zones 13 which engage against the bottom surfaces of the ledges 5a and which advantageously are of thickness e2 greater than 10 mm and preferably less than 15 mm;
- two vertical side flanges 15 each extending upwards from the web 12, each of the flanges advantageously having thickness e3 greater than 5 mm and preferably less than 10 mm; and
- two horizontal lips 17 extending the top ends of the vertical flanges 15 and extending towards each other so as to leave between them a slot for receiving a moving bar 2, the lips 17 advantageously being of a thickness e4 greater than 5 mm, and preferably less than 10 mm.

Each lip 17 advantageously includes a wedge-shaped rib 19 which fits substantially against the shape of the sloping wall 9 of the corresponding lip 7.

The runner is fixed to the floor 21 of the vehicle by means of bolts, for example, e.g. bolts 23 passing through holes 24, 25 formed respectively in register through the web of the stationary bar 3 and through the web of the reinforcing bar 11, with the enlarged head of each bolt 23 bearing against the web 5 of the bar 3.

In addition, in the example shown, the moving bar 2 of the runner has a vertical fin 2a which projects out from the stationary bar 3 and which extends into the inside of said stationary bar via an upside-down channel section portion comprising:

- a top horizontal wall or web 26;
- two vertical flanges 27 which extend downwards from the two sides of the web 26, one of the flanges 27 extending the vertical fin 2a of the moving bar 2 in the example described; and
- two trough-shaped lips 28 extending outwards beneath the lips 27 of the stationary bar 3, with the above-mentioned balls 4 being interposed therebetween both between the lips 28 and the sloping walls 9 of the lips 7 of the stationary bar, and also between the lips 28 and the ledges 5a and the flanges 6 of the stationary bar 3.

With a runner of the kind described above, it has been found that the presence of the reinforcing bar 11 can increase the mechanical strength of the runner by 50% against forces applied to the moving bar 2 in the event of the vehicle suffering a frontal impact accident.

What is claimed is:

1. A vehicle seat runner, comprising a stationary channel section bar made of folded and cut steel sheet, said stationary presenting bar presenting:

a web;

two side flanges extending parallel to each other, each from the web to the free end; and two lips extending toward each other from the respective free ends of the two side flanges, and defining between them a slot for receiving at least one support member adapted to be fixed to the vehicle seat;

the stationary bar extending over a certain length between a front end and a rear end for securing to the floor of the vehicle;

wherein the stationary bar is engaged in an reinforcing bar made by extruding a light alloy, the reinforcing bar being secured to the stationary bar and presenting, a substantially channel section with a web placed against the web of the stationary bar, two side flanges hugging the flanges of the stationary bar, and two lips extending the flanges of said reinforcing bar and overlying the lips of the stationary bar, so as to bear against said lips of the stationary bar;

wherein said reinforcing bar is placed at the rear end of the stationary bar and extends over a length that is shorter than one-third of the length of the stationary bar; and wherein the lips of the stationary bar are in front of reentrant troughs, each having a segment sloping towards the other lip and toward the web of the stationary bar, and the lips of the reinforcing bar present respective lips matching the shape of said sloping segment;

in which at least one hole is made through the web of the stationary bar towards the rear end of said stationary bar in order to receive a bolt for fixing to the floor of the vehicle, the web of the reinforcing bar also having a hole in register with the hole in the web of the stationary bar so as to allow said bolt to pass.

2. A vehicle seat runner, comprising a stationary channel section bar made of folded and cut steel sheet, said stationary presenting bar presenting:

a web;

two side flanges extending parallel to each other, each from the web to the free end; and two lips extending toward each other from the respective free ends of the two side flanges, and defining between them a slot for receiving at least one support member adapted to be fixed to the vehicle seat;

the stationary bar extending over a certain length between a front end and a rear end for securing to the floor of the vehicle;

wherein the stationary bar is engaged in an reinforcing bar made by extruding a light alloy, the reinforcing bar being secured to the stationary bar and presenting, a substantially channel section with a web placed against the web of the stationary bar, two side flanges hugging the flanges of the stationary bar, and two lips extending the flanges of said reinforcing bar and overlying the lips of the stationary bar, so as to bear against said lips of the stationary bar;

wherein said reinforcing bar is placed at the rear end of the stationary bar and extends over a length that is shorter than one-third of the length of the stationary bar; and wherein the lips of the stationary bar are in front of reentrant troughs, each having a segment sloping towards the other lip and toward the web of the stationary bar, and the lips of the reinforcing bar present respective lips matching the shape of said sloping segment;

in which the reinforcing bar is of a thickness greater than 5 mm, at least over its flanges and lips; and in which the web of the stationary bar forms two side ledges extending towards the lips of said stationary bar and extended by the flanges of the stationary bar, while the reinforcing bar presents two thick zones placed in register with said ledges and coming into contact with the stationary bar beneath said ledges, respectively, said thick zones presenting a thickness greater than the thickness of the flanges and the reinforcing bar.

3. A runner according to claim 2, in which the thick zones of the web of the reinforcing bar have a thickness of material of not less than 10 mm.

4. A vehicle seat assembly comprising:

a vehicle seat;

two parallel runners each including a stationary channel section secured to a vehicle floor and at least one support member fixed to the vehicle seat;

the stationary bar of each runner extending over a certain length between a front end and a rear end and including;

a web;

two sides flanges extending parallel to each other, each from the web to the free end;

two lips extending toward each other from the respective free ends of the two sides flanges, and defining between them a slot for receiving said at least one support member;

an extruded reinforcing bar made out of a light alloy, said reinforcing bar being fitted on the rear end of the stationary bar and having a substantially channel section with a web placed against the web of the stationary bar, two side flanges hugging the flanges of the stationary bar, and two lips extending the flanges of said reinforcing bar and bearing on the lips of the stationary bar, said reinforcing bar and extending over a length that is shorter than one third of the length of the stationary bar; and at least one fixing member passing through the respective webs of the stationary bar and of the reinforcing bar and fixed to the vehicle floor.

* * * * *

UNITED STATES PATENT AND TRADEMARK OFFICE
CERTIFICATE OF CORRECTION

PATENT NO. : 6,676,099 B2
DATED : January 13, 2004
INVENTOR(S) : Patrick Mallard et al.

It is certified that error appears in the above-identified patent and that said Letters Patent is hereby corrected as shown below:

<u>Title page,</u>
Item [73], Assignee, please delete "Sieges" and insert -- Siéges --

Signed and Sealed this

Fifteenth Day of June, 2004

JON W. DUDAS
*Acting Director of the United States Patent and Trademark Office*